W. M. STEHLEY.
Harrow and Roller Combined.

No. 199,755. Patented Jan. 29, 1878.

Attest:
John C. Wilson.
Alexander Knox

Inventor:
Wm. M. Stehley
by Theophilus Weaver
Atty.

UNITED STATES PATENT OFFICE.

WILLIAM M. STEHLEY, OF KING WILLIAM COURT-HOUSE, VIRGINIA.

IMPROVEMENT IN HARROW AND ROLLER COMBINED.

Specification forming part of Letters Patent No. 199,755, dated January 29, 1878; application filed August 31, 1877.

*To all whom it may concern:*

Be it known that I, WILLIAM M. STEHLEY, of King William Court-House, King William county, and State of Virginia, have invented a new and useful Improvement in Harrow and Rollers Combined, which improvement is fully set forth in the following specification and accompanying drawings, in which—

Figure 1:
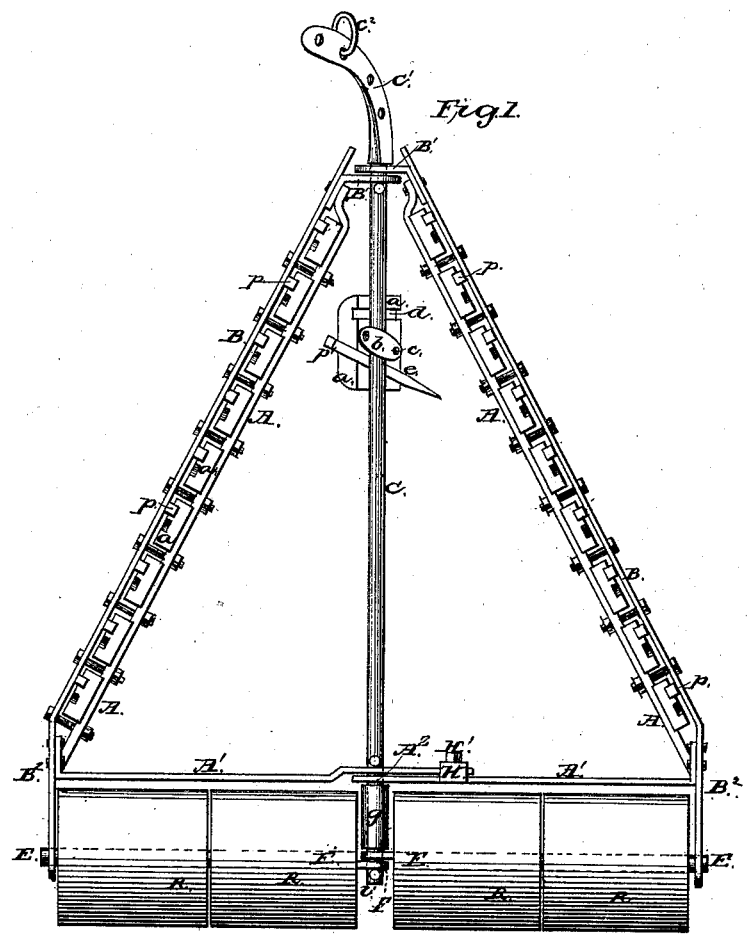
Figure 2:
Figure 3:
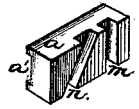

Figure 1 is a perspective view of my improved harrow and rollers combined. Fig. 2 is a perspective view of one of the tooth-holders detached from the harrow-bars. Fig. 3 is a sectional view of the transverse-bar lock.

The subject of my present application for patent is an improvement on my patent of January 23, 1877, and numbered 186,506.

The novel and useful features thereof consist, first, in certain tooth-holding blocks, peculiarly channeled to embrace and hold the teeth in a vertical or inclined direction, to form either a cutting or smoothing implement, as desired, and to embrace and be held by the bars composing the harrow-frame, when clamped together by bolts and nuts at proper places, in such manner that said blocks may be adjusted to different places along said frames, and firmly held to places of duty thereon, when a coarser or finer harrow is desirable; second, a locking device on the hinged transverse harrow-stays, by which the jointed or flexibly-arranged harrow, when the rollers are employed, is converted into a rigid or inflexible harrow, when for various reasons the rollers are detached; third, one or more teeth arranged on the draft-bar, to properly stroke the ground not dressed by the harrow sides.

I construct my improved implement of wrought and cast iron, and the teeth preferably of steel. The harrow sides are composed of two bars each, A and B, bolted together as shown, leaving a space between them, in which are inserted the teeth $p$, which are simple straight-pointed bars inserted or ledged in cast-iron holders, as shown in Figs. 1 and 2. Each tooth-holder has the vertical and inclined channels $m$ $n$, respectively, to ledge the tooth when set either for cutting or smoothing, and has the horizontal channel $a'$ in its back $a$, to sit securely against one of the bars A or B, which is partially embedded in said channel.

The bars B B are joined together at $B^1 B^1$ by the draft-bar C $C^1$, as shown. The rear ends $B^2 B^2$ of said bars are connected with the outer ends of the carriers E E, as shown, being stayed together by the transverse bars $A^1 A^1$, which are also joined together at $A^2$ by the draft-bar C $C^1$, as shown. The rollers R—four in number—are paired, as shown, being mounted on the carriers E E, which are hinged together at F by the rear end of draft-bar C $C'$. Between the two hinges, at $A^2$ and F, a sleeve, $g$, is inserted about said draft-bar, to properly distance the said joints from each other, so as to keep the scraper-bar $A^1 A^1$ properly aligned with the rollers R, a pin, $l$, being inserted in draft-bar C $C'$, as shown, to keep the parts dependently united.

On the draft-bar C $C'$ there is mounted one or more teeth in erect or inclined position, as desired, and as shown in Fig. 1. The object of this arrangement is to provide a means to harrow the ground passed over by the middle of the implement and not reached by the teeth in the harrow sides.

To attach a tooth to the draft-bar C $C'$, as stated, a block, $a$, is bolted thereto by means of a plate, $b$, and bolt or bolts $c$, the face of the said block being channeled to securely hug said bar, as shown, holding the tooth in one of the sockets $d$ or $e$ between said bar and block.

When the rollers R, which are of cast-iron, are on the harrow in position, as set forth, they serve by their weight to keep the harrow-frames properly down to the work; but when for certain kinds of work they are removed from the implement, it is found the action of the teeth in the harrow sides tends to lift up the middle of the implement along the joints, the sides walking inwardly. To correct this tendency, a locking device is employed on the hinged transverse stays of the implement, to be used only when said rollers are removed therefrom. Said locking device consists of the said transverse stays $A^1$, one of which extends beyond the middle of the implement, and at this end a capping-clip, H, is applied by a bolt, H', in such manner as to snugly embrace said stays A¹ in position, as shown, and so as to resist vertical motion or flexure about the draft-bar C C', thus converting the implement into a single rigid harrow.

It may be observed that the front end C' of draft-bar C is curved upward, and is perforated to receive an open link at various heights, whereby the bearing of the draft is regulated as desired.

Having thus fully and clearly described my invention, what I regard as new, and what I desire to secure by Letters Patent, is embraced substantially in the following:

1. In a non-reversible harrow, the combination of pairs of bars A B, with plain bar-teeth $p$, held rigidly interposed between them by teeth-holding pieces $a$, rabbeted at $a'$, and socketed at $m$ and $n$ to secure the said teeth rigidly, adjustably clamped in vertical or inclined direction, in the manner as and for the purpose set forth.

2. The locking device, as described, consisting of the harrow transverse stays or scrapers A¹, clip H, bolt H', and draft-bar C C', all operating jointly to hold the otherwise flexibly-united side harrows A B A¹ rigidly extended, substantially as set forth.

3. Two harrows, A B A¹, each provided with a pair of rollers, R, inflexibly connected therewith, and with the transverse parts A¹, in combination with each other by means solely of the draft-bar C C', as set forth.

In testimony that I claim the foregoing as my invention I have hereunto set my hand and seal this 22d day of August, 1877.

WM. M. STEHLEY. [L. S.]

Witnesses:
 JNO. D. FOSTER,
 G. T. WARING.